United States Patent
Decker

(10) Patent No.: US 8,924,167 B2
(45) Date of Patent: Dec. 30, 2014

(54) SEDIMENT MONITORING SYSTEM FOR STORMWATER MANAGEMENT FACILITIES

(76) Inventor: Thomas R. Decker, Bloomsbury, NJ (US)

( * ) Notice: Subject to any disclaimer, the term of this patent is extended or adjusted under 35 U.S.C. 154(b) by 428 days.

(21) Appl. No.: 13/478,276

(22) Filed: May 23, 2012

(65) Prior Publication Data

US 2013/0317766 A1 Nov. 28, 2013

(51) Int. Cl.
*G01F 17/00* (2006.01)
*G01F 23/26* (2006.01)

(52) U.S. Cl.
USPC .......................................... 702/55; 73/304 C

(58) Field of Classification Search
CPC . G01F 23/00; G01F 23/0053; G01F 23/0061; G01F 23/0069; G01F 23/0076; G01F 23/26; G01F 23/263; G01F 23/28; G01F 23/296; G01F 23/2962; G01F 23/2968
USPC ............... 702/55, 45, 47–48, 50, 52, 54, 127, 702/156, 159, 166, 168, 171, 188–189; 73/290 R, 291, 304 C, 304 R
See application file for complete search history.

(56) References Cited

U.S. PATENT DOCUMENTS

| | | | |
|---|---|---|---|
| 3,691,839 A | 9/1972 | Lasher | |
| 4,003,259 A | 1/1977 | Hope | |
| 4,715,966 A | 12/1987 | Bowman | |
| 5,562,819 A * | 10/1996 | Turner et al. | 210/85 |
| 5,929,337 A | 7/1999 | Collins et al. | |
| 5,973,415 A | 10/1999 | Brenner et al. | |
| 6,530,274 B1 | 3/2003 | Philbeck | |
| 6,539,794 B1 | 4/2003 | Otto et al. | |
| 6,615,658 B2 | 9/2003 | Snelling | |
| 6,832,516 B1 | 12/2004 | Dam et al. | |
| 7,399,985 B2 | 7/2008 | Mruk et al. | |
| 7,596,999 B1 | 10/2009 | Vitarelli | |
| 7,610,805 B2 | 11/2009 | Crider | |
| 2007/0256983 A1 * | 11/2007 | Hinckley et al. | 210/739 |
| 2010/0126267 A1 | 5/2010 | Agam et al. | |

* cited by examiner

*Primary Examiner* — Toan Le
(74) *Attorney, Agent, or Firm* — Thomas J. Germinario

(57) ABSTRACT

A dual sensor sediment monitoring system for stormwater management facilities includes a capacitive sensor and an ultrasonic sensor. The former periodically determines if a liquid layer exists above the sediment and activates the ultrasonic sensor when it does not. The echo delay measured by the ultrasonic sensor is used to calculate the sediment level, which is wirelessly transmitted to a remote computer for database compilation and use in scheduling maintenance involving sediment removal.

9 Claims, 2 Drawing Sheets

SEDIMENT MONITORING SYSTEM FOR STORMWATER MANAGEMENT FACILITIES

BACKGROUND OF THE INVENTION

The present invention relates to the general field of sensors for measuring the level of material in a container, and more particularly to the means for remotely monitoring the level of sediment that accumulates within stormwater management facilities.

Stormwater management facilities, including detention basins and manufactured treatment devices, are installed to capture suspended solids in stormwater in order to improve water quality. Over time, the suspended solids accumulate in the stormwater management facilities and require cleaning. In the absence of a sensor system for measuring the accumulated sediment level, maintenance personnel must periodically physically access the facilities to view sediment levels.

While a number of sensors are available for measuring the level of liquids or solids in a container, these sensors are not adapted to measuring the level of a heterogeneous sludge or slurry of the kind that often accumulates in stormwater facilities. Adding to the complexity of measuring stormwater sediment levels is the frequent presence of floating debris and/or oil.

The patents in this field includes several float-type sensors for monitoring fluid levels. Examples of these are the Lasher (U.S. Pat. No. 3,691,839) and Philbeck (U.S. Pat. No. 6,530,274). Since these devices depend upon the buoyancy of the float in liquid, they are not adaptable to monitoring the level of a solid or semi-solid sediment or sludge.

A non-buoyant float for monitoring the level of sludge in a septic tank is taught by the Bowman (U.S. Pat. No. 4,715,966). A similar non-buoyant float for monitoring the level of sediment in a stormwater management facility is disclosed by the Vitarelli (U.S. Pat. No. 7,596,999). Such contact-based systems have limited accuracy and life cycles due to their moving parts, and they are not well suited to semi-fluid sludges.

Examples of non-contact liquid level monitoring sensors are described in the Snelling (U.S. Pat. No. 6,615,658) and Collins et al. (U.S. Pat. No. 5,929,337) and the U.S. patent publication of Agam et al. (2010/0126267). Since the Snelling sensor is based on the larger difference in thermal conductivity between liquid and vapor phases, it is not readily adaptable to detecting a liquid/solid or air/solid interface. The Collins patent uses ultrasound propagation to measure void spaces in beverage containers. The Agam publication is directed to an ultrasound sensor for detecting fluid interfaces in propane tanks.

A third type of non-contact liquid level monitoring sensor uses infra-red optical radiation from an LED, as taught by the Mruk et al. (U.S. Pat. No. 7,399,985). A fourth type of non-contact level sensor uses differential capacitance to measure the relative liquid content of a vessel, as described in the Brenner et al. (U.S. Pat. No. 5,973,415).

There are two particular problems encountered in measuring the sediment level in a stormwater management facility: (1) the sediment layer is often mixed with and/or suspended in a layer of residual stormwater, such that the liquid/solid interface is not well defined, and (2) floating solid debris is usually present in the stormwater, further obscuring the liquid/solid boundary. Optimally, a dual-sensor system can be used to avoid false and inaccurate readings based on the foregoing factors. For example, an ultrasound sensor could be combined with a capacitive sensor. Under conditions of a dry sediment layer, the ultrasound reading would accurately reflect the sediment level, but the capacitive data would be more relevant under slurry/sludge type conditions.

SUMMARY OF THE INVENTION

The dual sensor sediment monitoring system proposed in the present invention comprises a capacitive sensor and an ultrasonic level sensor. The capacitive sensor has a sensor rod, comprising multiple capacitive elements, that extends upward from or downward toward the bottom or floor of the stormwater management tank or basin. The capacitive sensor is preferably of the type disclosed in U.S. Pat. No. 4,003,259, which is incorporated herein by reference, and is capable of measuring capacitance at various elevation levels ($C_{L1}$, $C_{L2}$ . . . ) above the base/floor relative to the capacitance $C_{AIR}$ measured at the upper end of the sensor rod exposed to the air.

The capacitance measured at a given elevation of the sensor rod is proportional to the dielectric constant of the medium in which the rod is immersed at that level. The dielectric constant of air is 1, while the dielectric constant of water is about 80. For silts and sediments, the dielectric constant can range from 5 to 30. Therefore, a capacitance measurement above 30 $C_{AIR}$ would be indicative of the presence of a water/slurry layer above the sediment layer.

The ultrasonic level sensor is installed at some height above the floor of the stormwater management tank/basin and comprises an ultrasonic transponder incorporating a transmitting unit and a receiving unit. A downward-pointing transponder measures the level of the liquid or solid material surface by detecting the time delay between transmission of an ultrasound pulse and reception of its echo from the liquid or solid surface below. The distance from the transponder to the material surface is one-half the echo time delay multiplied by the speed of sound in air. This distance is then subtracted from the installation height of the ultrasonic sensor above the floor of the stormwater tank/basin to obtain the level of the material surface above the floor.

The ultrasonic level sensor is not activated until the maximum capacitance measured by the capacitive sensor falls below the capacitance $C_{LIQ}$ indicative of the presence of a liquid water/slurry layer, typically less than 30 $C_{AIR}$. This is because ultrasound is totally reflected at an air-water boundary, so that in the case of a sediment layer covered by a water/slurry layer, the ultrasound pulse would not penetrate the water/slurry layer to reach the sediment layer and reflect from it to produce an echo.

Therefore, in the present invention the ultrasonic level sensor remains inactive until the capacitive sensor has a maximum reading $C_{MAX}$ below $C_{LIQ}$, at which point a switching circuit energizes the ultrasonic transponder, causing it to transmit an ultrasonic pulse and receive its echo from the sediment surface below. Using the methodology described above, a microprocessor in or associated with the ultrasonic sensor calculates the level of the accumulated sediment and sends this sediment level data digitally to a wireless transmission unit.

The wireless transmission unit, in turn, sends the sediment level data to a remote computer, on which it is compiled in a database and optionally uploaded to a website. The remote database and website can also serve as a means of tracking past maintenance activities and scheduling future sediment removal.

Both the capacitive sensor and the ultrasonic level sensor are powered by low voltage batteries or solar panels. During each month, the capacitive sensor is activated periodically, such as once per week, until a reading below $C_{LIQ}$ is obtained, to trigger a sediment level measurement by the ultrasonic level sensor.

Optionally, for stormwater management facilities in which the sediment layer is seldom not covered with a water/slurry layer, the elevation level "n" of the greatest capacitance reading $C_{Ln}$ below $C_{LIQ}$ can be used as an approximate sediment level, which can be wirelessly transmitted periodically to the remote computer for database compilation and/or website upload.

In addition to being transmitted to a remote computer, the sediment level measurements can be stored locally on a RFID tag which can be read by maintenance workers in the vicinity of the stormwater management facility.

The foregoing summarizes the general design features of the present invention. In the following sections, a specific embodiment of the present invention will be described in some detail. This specific embodiment is intended to demonstrate the feasibility of implementing the present invention in accordance with the general design features discussed above. Therefore, the detailed description of this embodiment is offered for illustrative and exemplary purposes only, and they are not intended to limit the scope either of the foregoing summary description or of the claims which follow.

DETAILED DESCRIPTION OF THE PREFERRED EMBODIMENT

Figure 1:
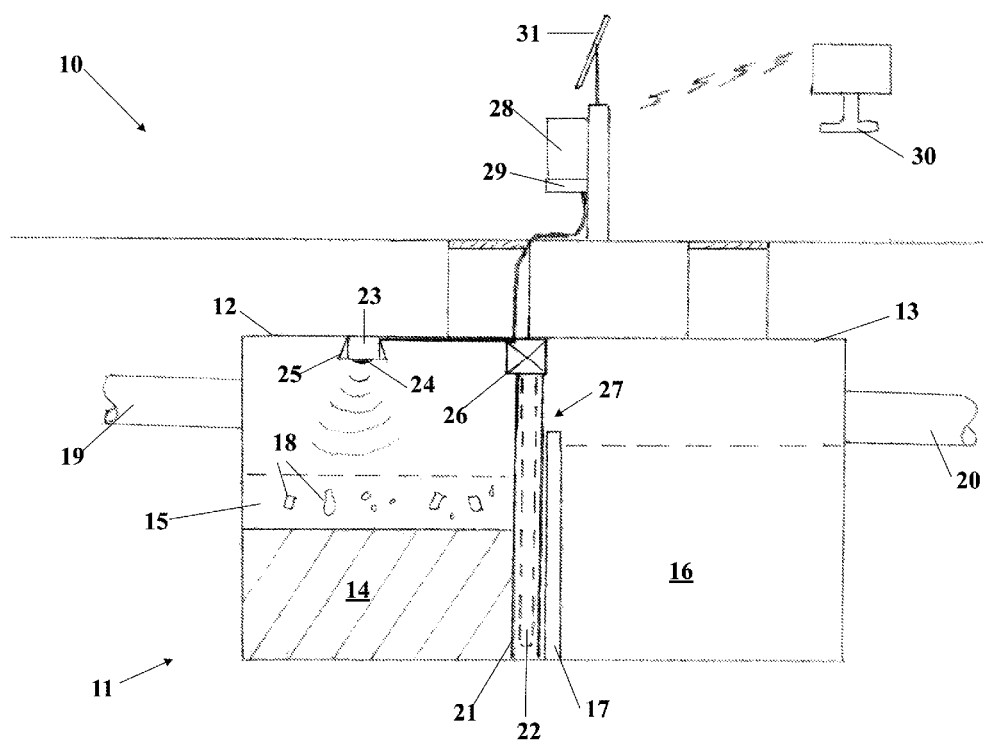
FIG. 1 is a schematic diagram of an exemplary stormwater management facility equipped with a sediment monitoring system, according to the preferred embodiment of the present invention.

Referring to FIG. 1, the preferred embodiment of the sediment monitoring system 10 is shown installed in a typical underground two-chamber stormwater setting tank 11. In the first chamber of the tank 12, a layer of sediment 14 accumulates at the bottom of the tank, frequently with a layer of water or slurry 15 above it, which may contain floating debris 18. The second chamber of the tank 13 contains cleaner stormwater 16 that has flowed over the central tank baffle 17. Untreated stormwater enters the tank 11 through an inflow pipe 19 into the first chamber 12, and treated stormwater leaves the tank 11 through an outflow pipe 20 from the second chamber 13.

A capacitive sensor rod 21, comprising multiple capacitive elements 22, extends downward within the first chamber of the tank 12 into the sediment layer 14. A downward-pointing ultrasonic transponder 23, comprising a transmitting unit 24 and a receiving unit 25, is located near the top of the first chamber of the tank 12, above the overflow level 27 of the central baffle 17.

Capacitance readings for various elevation levels from the capacitive sensor rod 21 are received and digitally processed by the sensor microprocessor 26, which is located above the sensor rod 21 and above the overflow level 27 of the central baffle 17. The sensor microprocessor 26 is programmed to receive and process capacitance readings on a periodic basis—in this example once per week. Upon receiving capacitance readings from the sensor rod 21, the microprocessor 26 determines the maximum of the readings $C_{MAX}$.

Figure 2:
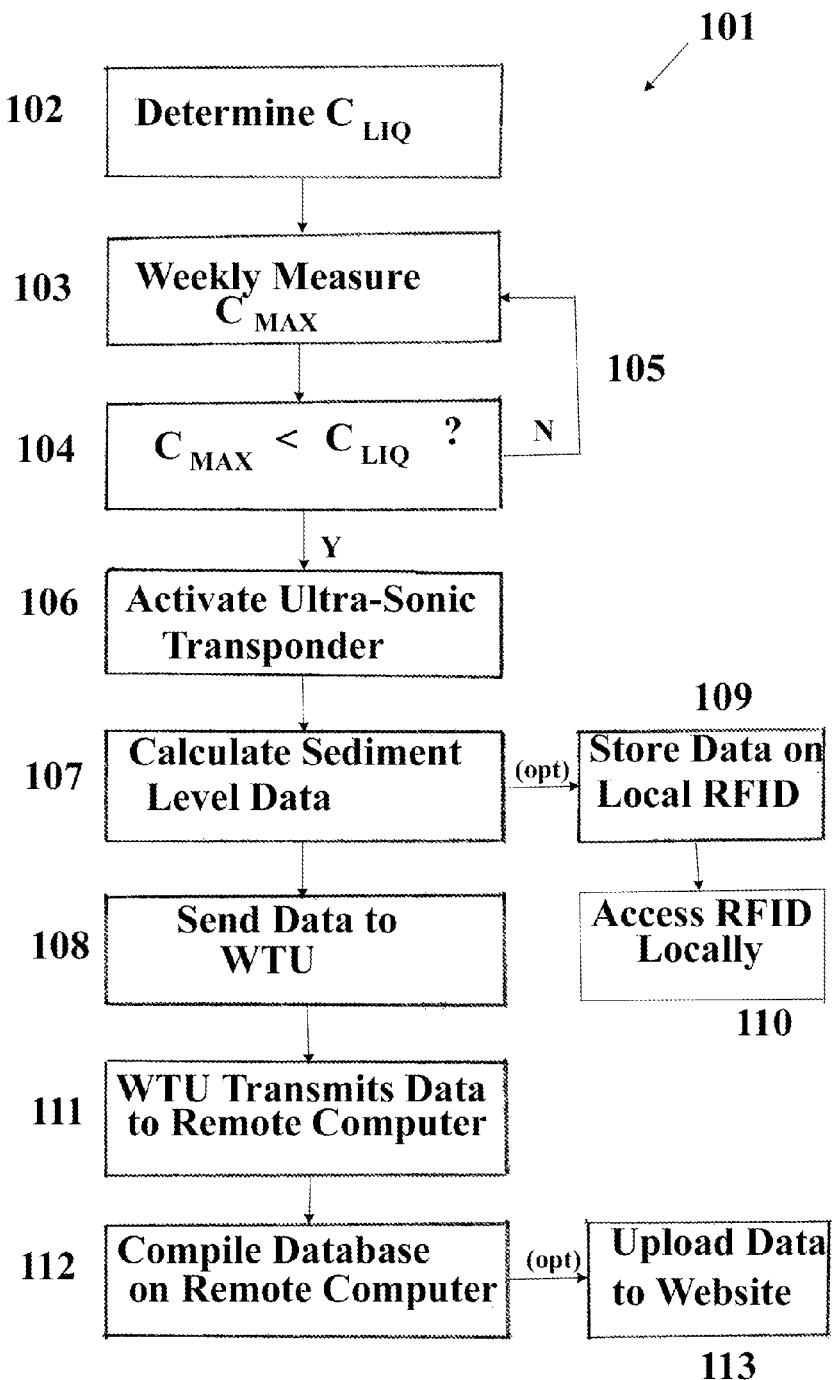
FIG. 2 is a process flow chart showing an exemplary method of implementing the sediment monitoring system for the stormwater management facility depicted in FIG. 1, according to the preferred embodiment of the present invention.

Upon determining the periodic maximum capacitance $C_{MAX}$, the sediment monitoring system then implements the process 101 shown in FIG. 2. The minimum capacitance $C_{LIQ}$ indicative of a liquid water/slurry layer 15 above the sediment layer 14 is first established 102, either by selecting an expected value, such as $C_{LIQ}=30\ C_{AIR}$, or by an installation-specific calibration process. Next the weekly measurement of $C_{MAX}$ is taken 103, and the sensor microprocessor 26 determines if $C_{MAX}$ is less than $C_{LIQ}$ 104. If not, the system resets and reverts to the next weekly capacitance reading 105. If $C_{MAX}$ is less than $C_{LIQ}$, then the microprocessor 26 activates the ultrasonic transponder 23, which transmits an ultrasonic signal downward toward the surface of the sediment layer 14 and receives an echo signal 106.

Based on the time delay between the ultrasonic transmission and the echo reception, the microprocessor 26 calculates a sediment level 107 and relays the sediment level data in digital form to a wireless transmission unit (WTU) 108, which is located above ground (FIG. 1, reference 28). Optionally, the sediment level data can also be stored on a local RFID device 109 (FIG. 1, reference 29), from which it can be accessed on site by maintenance personnel using an RFID reader 110.

The wireless transmission unit (WTU) 28 then transmits the sediment level data to a remote computer 111 (FIG. 1, reference 30), which compiles the sediment data in a database 112 and optionally uploads it to a website 113. The remote database and/or website can also serve as a means of tracking past maintenance activities involving sediment removal and scheduling future sediment clean-out.

Optionally, for stormwater management facilities in which the sediment layer is seldom not covered with a water/slurry layer, the elevation level "n" of the greatest capacitance reading $C_{Ln}$ below $C_{LIQ}$ can be used as an approximate sediment level, which can be wirelessly transmitted periodically to the remote computer for database compilation and/or website upload.

The system can be powered by batteries located in the wireless transmission unit 28 and/or by an optional solar energy panel 31.

Although the preferred embodiment of the present invention has been disclosed for illustrative purposes, those skilled in the art will appreciate that many additions, modifications and substitutions are possible, without departing from the scope and spirit of the present invention as defined by the accompanying claims.

What is claimed is:

1. A system for monitoring the level of sediment accumulated on a bottom of a settling chamber of a stormwater management facility, comprising:

an elongated capacitive sensor extending into the sediment and into a fluid layer above the sediment, wherein the capacitive sensor periodically makes multiple measurements of the electrical capacitance of the sediment and of the fluid layer at multiple elevations above the bottom of the settling chamber and generates multiple corresponding capacitance readings, each of which has a corresponding capacitance elevation level;

a sensor microprocessor in electrical or wireless communication with the capacitive sensor, wherein the sensor microprocessor acquires the capacitance readings and determines a maximum capacitance from among the capacitance readings, and wherein the sensor microprocessor compares the maximum capacitance with a liquid reference capacitance that is indicative of the presence of a liquid layer above the sediment;

an ultrasonic sensor located above the sediment and in electrical or wireless communication with the sensor microprocessor, wherein the ultrasonic sensor is activated by the sensor microprocessor when the maximum capacitance is less than the liquid reference capacitance, and wherein the ultrasonic sensor, when activated, propagates an ultrasonic transmission signal downward toward the sediment and receives an echo signal reflected from the sediment, and wherein the ultrasonic sensor measures an echo delay between the time of propagation of the transmission signal and the time of reception of the echo signal and transmits the echo delay in digital data format to the sensor microprocessor, which uses the echo delay data to calculate a sediment level relative to the bottom of the settling chamber; and a wireless transmission unit located above the sediment and in electrical or wireless communication with the sensor microprocessor, wherein the wireless transmission unit acquires the sediment level in digital data format from the sensor microprocessor and wirelessly transmits the digital sediment level data to a remote computer, which compiles the digital sediment level data in a database.

2. The system according to claim 1, further comprising a RFID device in electrical or wireless communication with the sensor microprocessor, wherein the RFID device acquires the sediment level in digital data format from the sensor microprocessor and stores the sediment level data so that it is accessible by a local RFID reader.

3. The system according to claim 1, wherein the remote computer uploads the sediment level data to an internet website.

4. The system according to claim 3, wherein the database and the website are used to develop and track maintenance schedules involving removal of accumulated sediment from the settling chamber.

5. The system according to claim 1, wherein the sensor microprocessor periodically acquires from the capacitive sensor all capacitance readings that are less than the liquid reference capacitance and designates the capacitance readings so acquired as non-liquid capacitance readings, and wherein the sensor microprocessor determines the maximum non-liquid capacitance reading and designates the capacitance elevation level corresponding to the maximum non-liquid capacitance reading as an approximate sediment level, and wherein the sensor microprocessor periodically transmits the approximate sediment level in digital data format via the wireless transmission unit to the remote computer, which compiles the digital approximate sediment level data in a database.

6. A method for monitoring the level of sediment accumulated on a bottom of a settling chamber of a stormwater management facility, comprising the following steps:

periodically taking multiple measurements of the electrical capacitance of the sediment and of a fluid layer above the sediment;

generating, based on the electrical capacitance measurements, multiple corresponding capacitance readings;

determining a maximum capacitance from among the capacitance readings;

comparing the maximum capacitance with a liquid reference capacitance that is indicative of the presence of a liquid layer above the sediment;

when the maximum capacitance is less than the liquid reference capacitance, activating an ultrasonic sensor, located above the sediment, to propagate an ultrasonic transmission signal downward toward the sediment and to receive an echo signal reflected from the sediment, and to measure an echo delay between the two signals;

using the echo delay to calculate a sediment level relative to the bottom of the settling chamber; and wirelessly transmitting the sediment level to a remote computer for compilation in a database.

7. The method of claim 6, comprising the additional step of transmitting the sediment level to a local RFID device for data storage therein, which data storage is accessible to a local RFID reader.

8. The method of claim 7, comprising the further step of uploading the sediment level from the remote computer to an internet website.

9. The method of claim 8, comprising the further step of utilizing the database and the website to develop and track maintenance schedules involving removal of accumulated sediment from the settling chamber.

* * * * *